No. 678,229.  
J. W. CUTRER.  
RECORD.  
(Application filed Mar. 14, 1901.)

Patented July 9, 1901.

(No Model.)

UNITED STATES PATENT OFFICE.

JOHN W. CUTRER, OF CLARKSDALE, MISSISSIPPI.

RECORD.

SPECIFICATION forming part of Letters Patent No. 678,229, dated July 9, 1901.

Application filed March 14, 1901. Serial No. 51,155. (No model.)

*To all whom it may concern:*

Be it known that I, JOHN W. CUTRER, a citizen of the United States, residing at Clarksdale, in the county of Coahoma, State of Mississippi, have invented certain new and useful Improvements in Records, of which the following is a description, reference being had to the accompanying drawing.

My invention pertains to a record-book for bonds and coupons of corporations, &c.

The object of the invention is to provide a record which will show the date of payment of every bond and coupon covered by any series or number of series of bonds issued and from which record the outstanding bonds and coupons may be kept track of in a summarized form, so that the number and amount thereof can be determined at a glance. This object is accomplished by the construction shown in the accompanying drawing, in which the figure shows a page or sheet of my improved record.

The page or sheet is ruled entirely across its face and at its opposite vertical edges is ruled vertically to form parallel columns. At the top of the page is matter descriptive of the purpose of the record, such as "Record of payment or cancellation of bonds and coupons of ....," "Series No. ....., Issued....," "Denominations $....," "Interest.....%, payable semi-annually," "Outstanding....," "19.....," "$....," and "Coupons, each $....."

The denomination in the above heading in the drawing is given for sake of an example as $1,000, the interest as six per cent., the period of payment as semi-annual, and the value of coupons as thirty dollars each.

The first two columns at the left of the page are headed as follows: "Bonds, when paid" and "Bond No." The next two columns have a common heading "Coupons 19....," and below this one column is spaced to receive "January" and the other "July" if the interest is payable semi-annually. The next two colums are marked in like manner, and the words "When paid" appear at the top of all the columns except those having the headings "Bonds, when paid" and "Bond No."

The group of five columns at the right of the page have a common heading "No. and am't. of outstanding past due coupons," and beginning at the left these five columns are individually headed "No. out," "No. paid," "When paid," "Bal. out," and "Total out."

When a bond is paid, the date of the payment is noted in the column marked "Bonds when paid," and when coupons are paid, the dates of payment are entered in the proper column marked "Coupons 19....when paid."

The record can be ruled so as to cover payments of coupons annually, semi-annually, or quarterly, &c. The rulings can be made narrow, as the only memoranda entered are in figures indicating the dates of payments of bonds and coupons. The dates of the maturity of coupons will be inserted in the blank spaces left at the top of the columns for that purpose.

The drawing shows January and July coupons as an example.

The bond numbers should be inserted in the column headed "Bond No.," and the record of the payment of the coupons of each bond should be entered under the appropriate column on the same line on which the number of the bond is entered, the page being preferably made wide enough to keep an unbroken record of the coupon payments, and the pages can be made wide enough to carry the coupon payments through any desired number of years, or each page can be numbered as above to show the payment of bonds and coupons for a limited period only, and then the record can be carried on and completed by transferring the same bond numbers to other pages in the book or other like books, as in the case of transfers of accounts on daily balance-books of banks.

The number of outstanding coupons can be determined at any time by counting up the vacant places left in each column where the fact of the payment of coupons shall not have been recorded by entering the dates of payment.

As a convenient method to keep account of outstanding past-due coupons blanks and proper rulings are provided at the extreme right-hand side of each page, (or of so many of the pages of the record as may be desired,) as has been described. These are contrived to keep track of the said outstanding coupons in a summarized form and so that the number and amount thereof at any given time can be determined at a glance. At the same time it is a check upon the record. For example, when all of January, 1901, coupons that are presented on the 1st of January are paid and so recorded there will be left outstanding, say, sixty coupons not presented. Hence sixty blank places will appear in that column. On the 15th day of January thirty of these coupons are presented and paid. The record then kept will show that from the first to and on to the 15th of January sixty coupons were out and that thirty were then paid, leaving a balance of thirty out, and as the figures show the coupons to be thirty dollars each the total amount outstanding will be nine hundred dollars. On the 1st of February thirty are out and then ten are paid, which fact will be noted on the record. This will then show the balance outstanding to be twenty, amounting to six hundred dollars. To check the entire record by the summary—say the summary shows thirty paid on January 15—the examiner will go through the columns and note how many coupons there were recorded as having been paid on January 15. If this record does not show thirty paid on that day, then a variance exists and the discrepancy must be accounted for. If the records agree throughout, then it is demonstrated that the summary shows the correct number out on the date given.

The headings, rulings, and forms generally covered by the paper are a complete and convenient record showing at a glance the exact condition of the bond and interest accounts of every concern on any given day without the necessity of checking through or keeping a complicated system of books for the ascertainment of the same facts.

Having thus described my invention, what I claim, and desire to secure by Letters Patent, is—

A bond and coupon record-book, having marked spaces at the top of its pages for matter descriptive of the bonds such as the name of the maker, the series, date of issuance, denomination, rate of interest, and coupon value, the pages being ruled with horizontal lines crossing the page and with vertical lines separating the pages into vertical columns, the first two columns at the left being headed "Bond when paid" and "Bond No." respectively, the intermediate columns being arranged in groups, each group being headed by the word "Coupons" and a space for date, and each column of each group being headed "When paid," and the five columns at the right of the page being arranged in a group with the heading "Number and amount of outstanding past due coupons" and the separate columns of the group being headed respectively "No. out," "No. paid," "When paid," "Bal. out" and "Total out," the first two and intermediate columns being adapted to receive entries showing on each horizontal line the date of payment of each coupon of a particular bond if paid, and the columns at the right being adapted to receive entries relating to the whole group of bonds, summarizing the information shown as to individual bonds in the other columns; substantially as described.

In testimony whereof I affix my signature in presence of two witnesses.

JOHN W. CUTRER.

Witnesses:
A. J. McCORMICK,
L. A. COOK.